Figure 1:
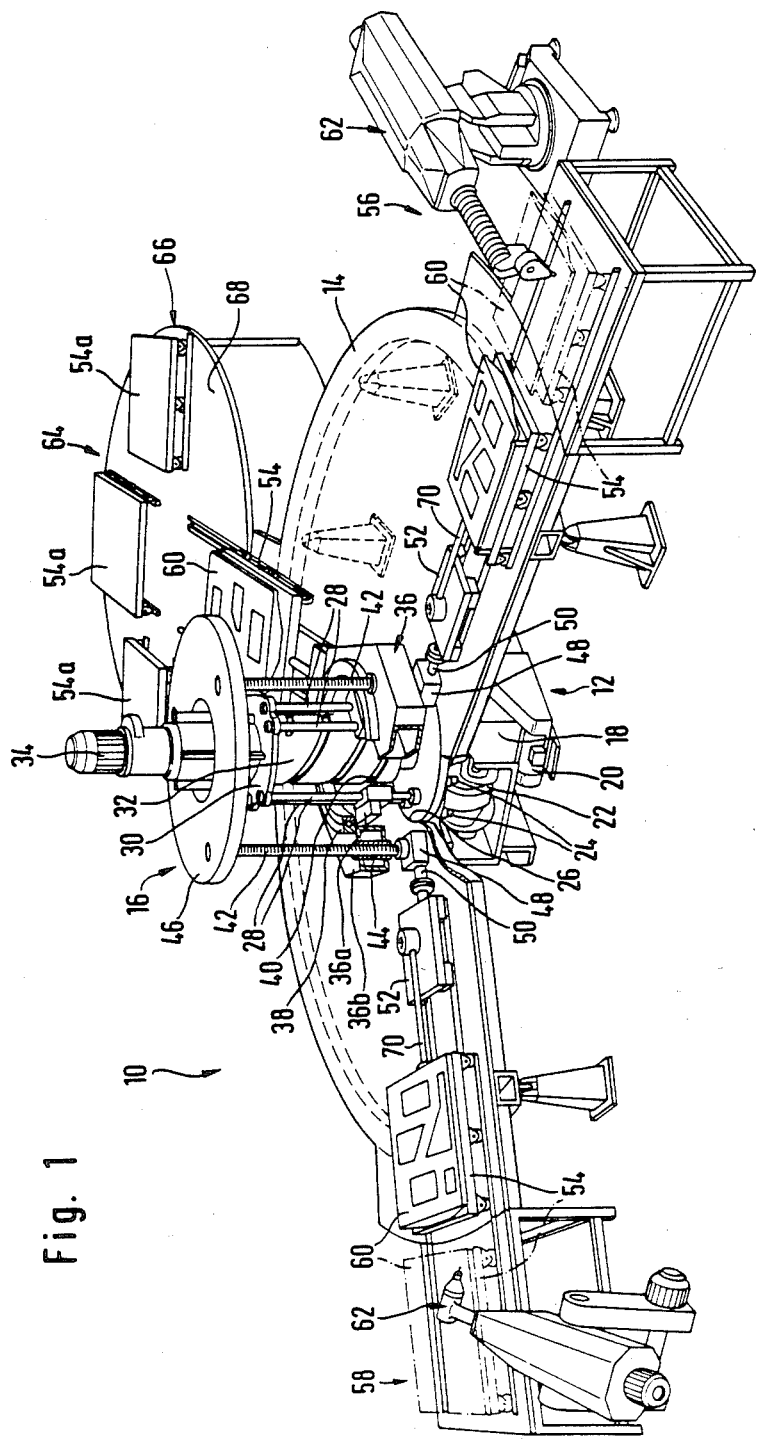

United States Patent [19]

Möller

[11] Patent Number: 4,795,021

[45] Date of Patent: Jan. 3, 1989

[54] TURNTABLE APPARATUS COMBINING VERTICAL WITH ROTARY MOTION

[75] Inventor: Reinfried Möller, Weinheim, Fed. Rep. of Germany

[73] Assignee: EXPERT Maschinenbau GmbH, Lorsch, Fed. Rep. of Germany

[21] Appl. No.: 86,632

[22] PCT Filed: Nov. 24, 1986

[86] PCT No.: PCT/EP86/00676

§ 371 Date: Jul. 21, 1987

§ 102(e) Date: Jul. 21, 1987

[87] PCT Pub. No.: WO87/03236

PCT Pub. Date: Jun. 4, 1987

[30] Foreign Application Priority Data

Nov. 30, 1985 [DE] Fed. Rep. of Germany ....... 3542373

[51] Int. Cl.[4] .............................................. B65G 47/00
[52] U.S. Cl. ............................. 198/346.1; 198/465.1; 198/476.1
[58] Field of Search .... 198/346.1, 346.2, 465.1–465.3, 198/476.1; 414/222, 223; 29/33 P, 563

[56] References Cited

U.S. PATENT DOCUMENTS 2,852,960  9/1958  Brems .
4,285,233  8/1981  Swis ................................ 198/465.1
4,291,797  9/1981  Ewertowski ..................... 198/465.1
4,326,624  4/1982  Ewertowski et al. ........... 198/346.1
4,669,948  6/1987  Moller ............................. 414/570

FOREIGN PATENT DOCUMENTS 640615  1/1984  Switzerland .

Primary Examiner—Joseph E. Valenza

[57] ABSTRACT

The turntable apparatus combining vertical with rotary motion has a table plate which can be rotated cyclically by a stepping drive. A lift carriage is nonrotatably mounted for upward and downward movement in the vertical direction. The lift carriage surrounds a rotatable cylinder rising vertically upward centrally from the turntable and provided with a cam groove which is engaged by a cam follower pin on the lift carriage. At a distance from and parallel to the cylinder there is rotatably mounted one or more threaded spindles whose nonself-locking thread is in threaded engagement each with a threaded bore in the lift carriage. At its bottom end at the table plate each threaded spindle is coupled by an angle drive with a rotatable threaded spindle running radially and parallel to the table plate surface, which in turn is in threaded engagement with a driver of a workpiece mounting carriage mounted in the radial direction on the table plate.

3 Claims, 2 Drawing Sheets

TURNTABLE APPARATUS COMBINING VERTICAL WITH ROTARY MOTION

The invention relates to a turntable apparatus combining vertical with rotary motion, having a table plate which can be made to rotate according to a given program of movement, and on which there is nonrotatably mounted a vertically ascending and descending carriage which surrounds a vertically disposed rotatable cylinder projecting centrally upward from the turntable plate and has incorporated into its circumferential surface a cam groove which is engaged by at least one cam follower pin which is coupled to the carriage and which, upon a rotation of the cylinder relative to the carriage, performs a vertical displacement and transmits it to the carriage.

Such a turntable apparatus combining vertical with rotary motion is known (DE-OS 33 44 805), which serves for the cyclical picking up of workpieces in a pick-up position, for bringing them smoothly into one or more working positions, and finally for advancing them to an offbearing position at which the workpieces are taken off and further advanced. The individual positions are at different levels which can be reached by the lift mechanism constructed on the turntable.

The invention is addressed to the problem of creating a turntable apparatus combining vertical with rotary motion in which the workpieces that are to be picked up, worked, and finally carried away, are to be brought to the individual cycle positions in a position that will be at the same level but situated radially outside of the turntable plate.

Setting out from an apparatus of the kind described above, this problem is solved according to the invention in that at least one threaded spindle with a thread pitch which is not self-locking is rotatably mounted on the turntable, and is in threaded engagement each with a complementary threaded bore in the lift carriage, and at its bottom end at the table plate is coupled by an angle drive to a threaded spindle which is rotatably mounted radially parallel to the table plate surface, and which is in threaded engagement with a driver for a workpiece carriage mounted for travel radially on the table plate, the ratio between the movement of the lift carriage and the displacement of the workpiece carriage associated therewith being selected such that the workpiece carriage, by starting the maximum vertical movement of the lift carriage, can be brought to a pick-up, working and/or offbearing station directly adjoining the turntable plate outside of the radial boundary of the latter. The vertical movement of the lift carriage, therefore, unlike the known apparatus, is converted by the threaded spindles coupled to one another by an angle drive, to a movement that is horizontal and radial to the turntable and is transferred to a workpiece carriage coupled thereto.

In a first embodiment of the invention, the cylinder driving the lift carriage, and its drive, are mounted centrally on a nonrotatable part of the housing for the stepping drive of the turntable, within an opening in the rotatable table plate, and the lift carriage is divided into two lift carriage rings which are rotatable relative to one another but coupled to one another in the lifting direction of the lift carriage, the threaded spindles driving the angle drive being engaged each with a threaded bore in the radially outer lift carriage ring, while the cam follower pin or pins engaging the cam groove of the cylinder are disposed on the inner lift carriage ring.

In an alternative second embodiment, the cylinder driving the lift carriage can also be mounted on the turntable so as to rotate with the latter, a motor being associated with it by which it can be driven for rotation relative to the turntable. Each vertical threaded drive spindle then passes through a threaded bore in a component of the lift table on which at least one cam follower pin engaging the cam groove of the cylinder is disposed. Dividing the lift table into two lift table rings rotatable relative to one another is then unnecessary.

The workpiece mounting carriages or the workpiece holders or tools mounted on them can, in an advantageous further development of the invention, be configured so as to be able to be uncoupled, at least in the stations situated outside of the radial boundary of the turntable table plate, from the workpiece mounting carriage or from the cam follower that is in threaded engagement with the horizontally and radially disposed threaded spindle that is associated with it in each case. Thus it is possible for example, to uncouple the workpiece holder carriage or the tools or workpiece holders mounted on the carriage, and replace them with others when this proves necessary as a result of changes in the kind of workpieces that are to be machined.

It may then be desirable to have an additional turntable adjacent to the turntable of the apparatus and having a table plate which can be rotated by a stepping drive and is at the same level as the table plate of the first turntable, the stepping drive of the additonal turntable being so configured that its table plate performs, for each full rotation, a number of steps that is the same as that of the first turntable plus 1, and the stepping drive of the additional turntable can be coupled selectively with the stepping drive of the turntable apparatus. On the additional turntable the necessary different workpiece holding carriages or workpiece holders or tools can then be reserved and, when needed, can be exchanged for the workpiece holding carriages or workpiece holders or tools previously situated on the turntable of the apparatus, which can then be reserved on the additional turntable until they are used again.

Figure 2:
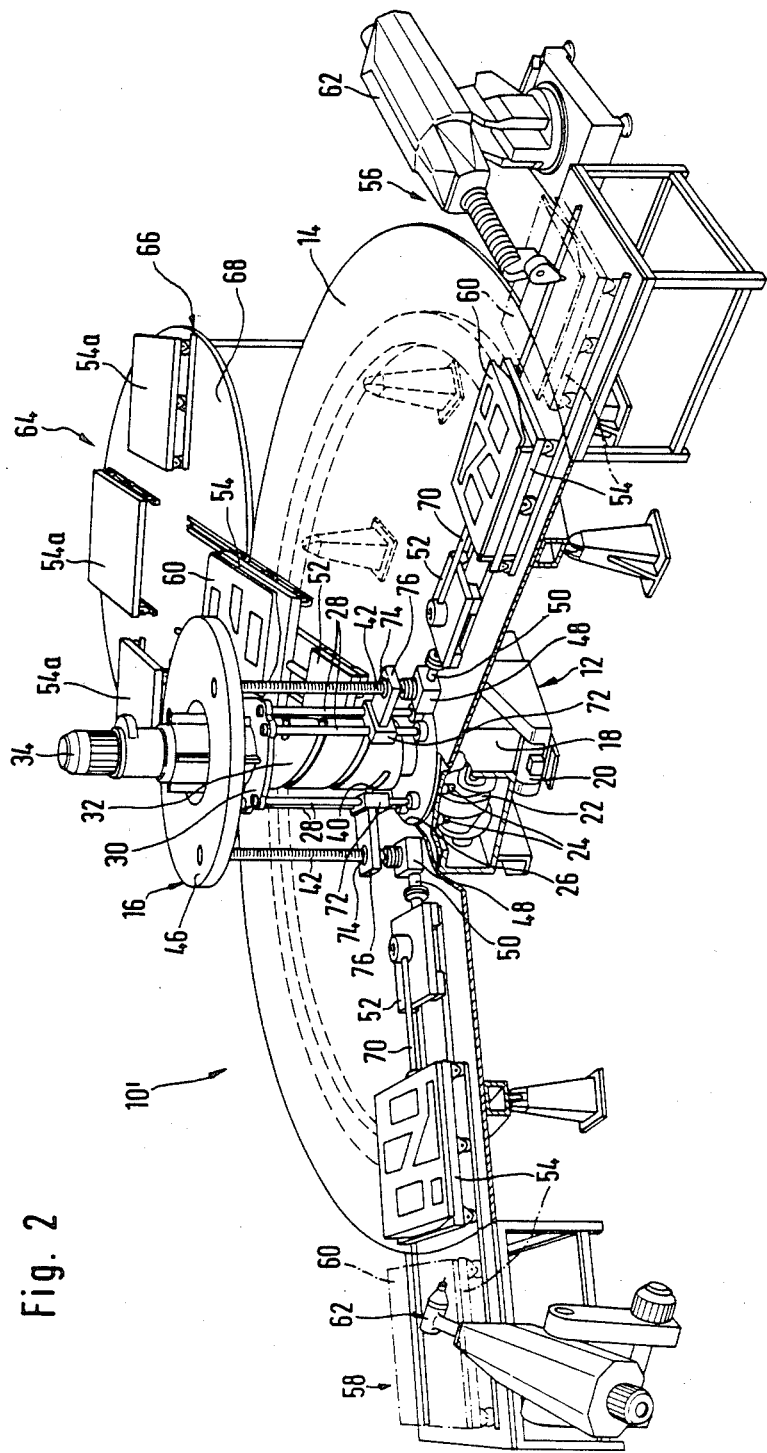

The invention will be further explained in the following description in conjunction with the drawing wherein:

FIG. 1 is a perspective view of a first embodiment of a turntable apparatus combining vertical with rotary motion according to the invention, whose turntable plate is partially cut away, and FIG. 2 is a view similar to that of FIG. 1 of a second embodiment of a turntable apparatus combining vertical with rotary motion according to the invention.

In FIG. 1 is shown a turntable apparatus combining vertical with rotary motion according to the invention, identified as a whole by the number 10, which is composed of a turntable 12 which can be rotated in steps of a certain angular amount by a stepping drive, and a lift mechanism 16 mounted on its table plate 14. The table plate 14 is journaled on the stationary turntable housing 18, the rotary drive being performed by a drive roll 22 which is journaled with horizontal axis of rotation under the table plate in the housing 18 and is driven by an electric motor 20 through an intermediate drive (not shown). In the circumferential surface of the drive roll 22 there is cut a cam groove which cooperates with transport pins 24 disposed at regular intervals on a corresponding arc on the underside of the table plate.

Turntables with stepping drives of this kind are known, so that it will be unnecessary to enter into a detailed description.

The lift mechanism 16 has a lift framework in the form of three pairs of parallel vertical guiding columns 28 mounted at equal angular intervals on a portion of the turntable housing 18 which is exposed within an opening 26 in the table plate 14, the upper ends of the columns being held on or in a horizontal plate 30. Centrally within the pairs of guiding columns 28 a cylinder 32 is mounted for rotation about its vertical axis of rotation coinciding with the axis of rotation of the turntable table plate 14, and for this purpose it is provided at its upper end with a motor 34 mounted on the horizontal plate.

A lift carriage 36 concentrically surrounding the cylinder 32 is mounted on the guiding columns 28 for displacement vertically upward and downward; it is composed of two concentric lift carriage rings 36a and 36b which are rotatable relative to one another on a corresponding bearing 38, but are fastened together in the vertical direction of movement of the lift carriage.

From the inner lift carriage ring 36a, cam follower pins 40 project toward the cylinder 32; their free ends are engaged each in a cam groove machined into the circumferential surface of the cylinder, a plurality (e.g., three) of cam follower pins 40, provided at equal angular intervals, being engaged each in an associated cam groove. The cylinder 32 thus has three such cam grooves of identical configuration incorporated into the circumferential surface, which are offset each at 120 degrees from the other.

Vertical threaded spindles 42—three in this case—offset from one another by equal angular amounts pass through the outer lift carriage ring 36b, being in threaded engagement with threaded sleeves 44 fixedly joined to the lift carriage ring 36b. The pitch of the complementary threads of the threaded spindles 42 and of the threaded sleeves 44 is selected such that no self-locking occurs. At their upper end the threaded spindles 42 are journaled in a common cross plate 46, while their bottom ends are carried into the housing of an angle drive 48 fastened on the table plate 14.

Out of the housing of the angle drive 48, radially outwardly pointing second horizontal threaded spindles 50 extend each parallel to the table plate 14, each being in threaded engagement with a driver 52 of a workpiece mounting carriage 54 mounted for movement in the radial direction on the table plate 14. It is apparent that, when the cylinder 32 is rotated by the motor 34 an upward or downward movement will be transmitted through the cam follower pins 40 engaged in the cam grooves. Due to the threaded engagement between the threaded spindles 42 and the threaded sleeves 44 in the outer lift carriage ring 36b, the threaded spindles 42 will then be caused to rotate, this rotation being transmitted through the angle drives 48 to the horizontal threaded spindles 50, which accordingly will move the drivers 52 in the radial direction and with them the workpiece mounting carriages 54 associated therewith. The transmission ratio between the upward and downward movement of the lift carriage 36 and the displacement of the associated workpiece mounting carriage 54 is selected such that the workpiece mounting carriage, by beginning the maximum vertical movement of the lift carriage 36 can be brought into a stationary station directly adjoining the turntable table plate outside of the radial boundary of the latter. In the drawing are represented two work stations 56 and 58 which are formed, let us say, by stationary frames on whose upper work surface level with the table plate 14 the workpieces 60 carried on the workpiece mounting carriage 54 are accessible for working—for example by means of the welding robots 62 which are indicated only diagrammatically. To hold the workpieces 60 in precise alignment in the work stations during the work, the workpiece mounting carriages 54 must be provided with mounts adapted to the workpieces 60. If the shape of the workpieces to be worked on changes, the workpiece mounts must be modified accordingly. For this purpose a third station 64 is represented in the drawing, in which workpiece mounting carriages 54a for different workpieces are reserved and can be exchanged step-wise for the workpiece mounting carriages 54 provided on the table plate 14. The station 64 is formed by an additional turntable 66 which can be rotated step-wise, on whose table plate 68 directly adjoining the table plate 14 of the turntable 12 and level with the latter are provided the radial rails to carry the workpiece mounting carriages 54a and 54. It is important that the turntable 66 perform the same number of steps as turntable 12, plus one. In the example represented, the turntable 12 has three divisions, i.e., it is provided with three workpiece mounting carriages, and upon each step the table plate 14 is rotated by 120 degrees. On the other hand the turntable 66 has four divisions, i.e., its table plate can accommodate a total of four tool mounting carriages in positions each offset by 90 degrees from the other, and upon each step the table plate 68 performs a swiveling movement of—accordingly—90 degrees. The table plate 68 therefore offers the possibility for accommodating one workpiece mounting carriage more than the table plate 14, or one mount can be free for the beginning of the exchange.

But for such an exchange to be at all possible, the workpiece mounting carriages 54 (or 54a as the case may be) must be able to be uncoupled from the drivers 52. For this uncoupling, therefore, the coupling rods 70 diagrammatically represented in the drawing, which connect the drivers 52 to the workpiece mounting carriages 54, are, let us assume, connected by releasable couplings (not shown) to the workpiece mounting carriages 54; these can be self-locking couplings, and, for the purpose of opening them when a workpiece mounting carriage 54 is transferred to the table plate 68, suitable automatic uncoupling devices can be provided.

For the turntable apparatus combining vertical with rotary motion 10 represented in FIG. 1 and described above, an apparatus of three divisions has been selected for the sake of greater ease of representation and simplicity of description; it has three workpiece mounting carriages 54 which are rotated in steps of 120 degrees each and then, in each stopped position, can be run radially beyond the outer limit of the turntable 14 into the work stations or into receiving or offbearing stations. It is to be noted, however, that the number of stations which can be accessed with the turntable can be increased by selecting a greater number of steps and by arranging a correspondingly greater number of workpiece mounting carriages 54 on the table plate 14 while simultaneously reducing the stepping angle accordingly. If, for example, workpieces are received at a station from a conveyor, different procedures are performed on them at three adjoining stations, and then they are to be unloaded onto a second conveyor at another offbearing station, a total of five stations each offset 72 degrees from the other must be accessible by the turntable 12. The turntable therefore must be driven by a 5-division stepping drive.

The embodiment represented in FIG. 2, of a turntable apparatus 10' combining vertical with rotary motion according to the invention, is largely the same as the apparatus 10 described in conjunction with FIG. 1, and therefore only the differences will be explained below, it being sufficient, for the avoidance of unnecessary repetition, to refer to the foregoing description, inasmuch as structurally and functional identical parts of the apparatus 10 and 10' are given identical reference numbers.

Unlike the apparatus 10, the lift device 16 of the turntable apparatus combining vertical with rotary motion 10' is mounted entirely on the table plate 14 of the turntable 12 and turns with the latter in its step-wise rotation. Consequently, the division of the lift carriage 36 of apparatus 10 into two concentric lift carriage rings which can rotate relative to one another but are coupled together in the lifting direction, can be eliminated. Instead, the lift carriage is replaced by a number of prismatic guides 72 provided with guide bores for the guiding columns, corresponding to the number of the guiding column pairs 28. From each surface of the prismatic guides 72 which faces the cylinder 32 a cam follower pin 40 radially engages the corresponding cam groove of the cylinder 32, while the vertical threaded spindles are in threaded engagement with complementary threaded bores 74 in collar projections 76 projecting radially outwardly from the guides 72. The prismatic guides 72 might also be combined into a one-piece ring concentrically surrounding the cylinder 32 and corresponding substantially to the lift carriage ring 36a. The chosen form of individual guides, on the other hand, saves material. On the other hand, however, such a one-piece ring may be necessary if the turntable 12 is to be made with a greater number of divisions for a greater number of workpiece mounting carriages 54, since then the number of guiding column pairs 28, like that of the guides, would increase and accordingly also the number of the cam grooves in the cylinder 32. In such a case the use of a one-piece lift carriage ring instead of individual guides 72 is to be preferred since then, even in the case of a greater number of divisions, three guiding column pairs 28 as well as three cam follower pins 40 projecting from the ring would suffice for the guidance of the lift ring, and accordingly also three cam grooves in the cylinder 32 would suffice to drive a greater number of vertical threaded spindles 42.

Since in this embodiment the entire raising and lowering apparatus 16 rotates with the table plate 14 of the turntable 12, the electrical power must be fed to the motor 34 driving the cylinder 32 through slip rings between the electrical cables and the motor, if the turntable 14 is driven in successive steps in the same sense of rotation, in the manner described above.

If, on the other hand, the workpiece mounting carriages 54 and 54a can be uncoupled from the drivers 52 in the work stations, in the manner also described, an oscillatory mode of operation of the turntable 12 is conceivable, whereby, after its drivers 52 have been uncoupled from the workpiece mounting carriages 54 that are standing in the work stations, the turntable is turned back again by the step angle while the workpieces 60 are being worked in the work stations, and then, before the advancing step next following, it is coupled again to the workpiece mounting carriages in the original stepping direction. For this kind of oscillatory mode of operation of the table plate 14 of the turntable 12, the electrical power can be fed to the motor 34 through flexible electrical cables, i.e., slip ring commutators are not necessary.

I claim:

1. A turntable apparatus combining vertical with rotary motion, comprising: a turntable having a table plate; means for rotating the table plate according to a given program of movement; at least one vertically ascending and descending lifting means having at least a portion which is non-rotatable with respect to the table plate; a vertically disposed rotatable cylinder projecting centrally upward from the turntable, arranged radially inwardly of the lifting means, and having incorporated into a circumferential surface thereof a cam groove; at least one cam follower pin engaging the respective cam groove and being coupled to the non-rotatable portion of the respective lifting means, said pin upon rotation of the cylinder relative to the lifting means performing a vertical displacement and transmitting the same to the lifting means; at least one threaded first spindle arranged at a distance from and parallel to the cylinder, each spindle having a non-self-locking thread pitch, being in threaded engagement respectively with a complementary threaded bore in the lifting means, and having a bottom end at the table plate; an angle drive coupling the first threaded spindle to a second threaded spindle which is rotatably mounted radially and parallel to the table plate and which is in threaded engagement with a driver for a workpiece carriage mounted for travel radially of the table plate; the ratio of movement of the lifting means relative to the workpiece mounting carriage associated therewith being such that maximum vertical downward movement of the lifting means moves the workpiece mounting carriage to a station radially outside the table plate.

2. A turntable apparatus according to claim 1, wherein said turntable has a central stationary part; the cylinder, means for rotating same, and means for rotating the table plate being mounted on the stationary part, the lifting means having concentric inner and outer rings coupled to one another in vertical direction, the inner ring forming said non-rotatable portion, the cam follower pin being disposed on the inner ring, and the first threaded spindle engaging a threaded bore in the outer ring.

3. A turntable apparatus according to claim 1, wherein the cylinder and means for rotating same are journaled on the turntable and rotatable therewith, each first threaded spindle passing through a threaded bore in a rotatable portion of the lifting means.

* * * * *